United States Patent Office 3,023,984
Patented Mar. 6, 1962

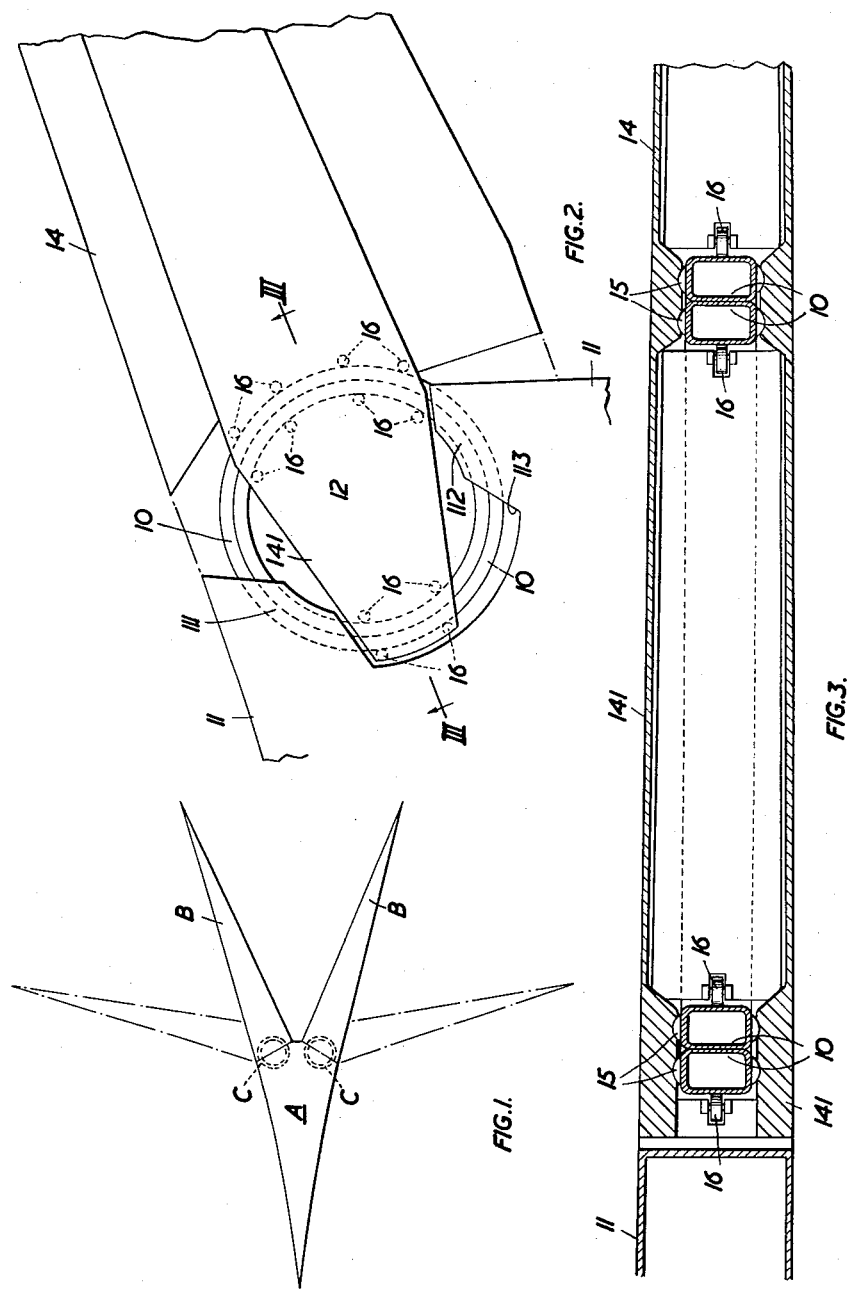

3,023,984
AEROPLANE HAVING WINGS ADJUSTABLE IN SWEEP
Maurice Joseph Brennan, Bembridge, Isle of Wight, England, assignor to Vickers-Armstrongs (Aircraft) Limited, London, England, a British company
Filed Nov. 18, 1960, Ser. No. 70,238
Claims priority, application Great Britain Nov. 20, 1959
2 Claims. (Cl. 244—46)

The invention is concerned with aeroplanes having wings pivotally adjustable in sweep, an example of which is described in United States Patent No. 2,915,261, and its object is to provide for such aeroplanes an improved pivot bearing for the wings, which whilst affording provision for the movements of the wings in sweep, will also possess a high degree of resistance to deflection under flexural and torsional loads on the wing. In addition, the bearing should be capable of accommodating changes in slope of the wing spar at the bearing, and of transmitting efficiently wing drag loads to the body.

The wing pivot bearing provided in accordance with this invention is constituted by a circular annulus which is supported at widely separated points in fixed parts of the body structure and at points spaced on either side of the pivot axis in the structure of the wing root. Conveniently, the annular pivot member is fixed to the body structure and slidable circumferentially in relation to bearing elements mounted in the wing root structure.

One embodiment of the invention, as applied to the wing pivots of an aeroplane such as that described in United States Patent No. 2,915,261, is hereinafter described with reference to the accompanying drawings, in which FIG. 1 is a diagrammatic plan view of the aeroplane to which the invention is applied, FIG. 2 is a fragmentary plan, drawn to a larger scale, of the pivot of one of the wings and of the adjacent parts of the body and wing structures, and FIG. 3 is a section taken on the line III—III of FIG. 2.

The aeroplane shown in FIG. 1 has a body (or fore-wing) A of delta-shaped plan form and two wings (or main-wings) B, B which are pivotally connected to the body A at each end of the base thereof. The actual pivot bearings of the wings, indicated at C, C, are the subject of the present invention. Referring now to FIGS. 2 and 3, it will be seen that the body structure incorporates at each pivot position a circular annulus 10 which may be fabricated as a composite member comprising two concentric rectangular-section tubes. Said annulus 10 is anchored to the body structure 11 at two points 111 and 112 spaced substantially diametrically, so that it occupies a position concentric with the pivot axis 12. The body structure 11 is recessed at 113 to reveal a considerable arc of the annulus 10 between the said anchorage points 111, 112.

The wing structure 14 is provided at points spaced on either side of the pivot axis 12 with bearing shoes 15, 15 by which the wing may be supported on the exposed parts of the pivot annulus 10, said bearing shoes 15 being arranged in opposed pairs to embrace the tube 10 and capable of sliding circumferentially along the same with movement of the wing in sweep. Said shoes 15 are conveniently of hemispherical form, as shown, and received in conformably shaped seatings in the wing structure, so as to be capable of accommodating themselves to the flexure of the wing under varying loads.

The wing structure 14 may be fashioned at the inner or root end with a root frame 141 of sectoral plan form which extends across the pivot axis, terminating in a narrow portion which incorporates bearing shoes 15 arranged to embrace the part of the pivot tube 10 which lies exposed in the afore-mentioned recessed portion 113 of the body structure 11.

On the outboard side of the pivot axis the wing structure 14 includes at least two sets of bearing shoes 15, arranged to cooperate with the pivot tube 10 at spaced points, whereby torsional loads on the wing are transferred to the pivot tube and thence to the body structure 11.

The wing structure 14 is positively located in relation to the pivot axis 12 by two opposed sets of rollers 16, 16 which are rotatably mounted in the structure 14, 141 so that they bear against the opposite sides of the annulus 10, as shown in FIG. 3. Thus, the annulus 10 has bearing surfaces respectively disposed at right angles to each other.

What I claim as my invention and desire to secure by Letters Patent is:

1. A wing pivot bearing for an airplane having a wing, a body, and means for adjusting said wing about a sweep axis with respect to said body, said wing pivot bearing comprising a circular annulus and means for supporting said annulus at spaced points in fixed parts of said body and at points spaced on either side of said sweep axis in the structure of said wing, said annulus comprising a tubular structure of rectangular cross-section, and said wing including two sets of bearing elements arranged to co-act with horizontal and vertical surfaces of said tubular annulus, respectively, each set of said bearing elements being in opposed pairs for cooperation with opposite surfaces of the annulus.

2. A bearing as claimed in claim 1, wherein one set of said bearing elements are hemi-spherical shoes for co-operation with the horizontal surfaces of the annulus, and wherein the second set of said bearing elements are rollers rotatably mounted for cooperation with the vertical surfaces of the annulus.

References Cited in the file of this patent
UNITED STATES PATENTS

| | | |
|---|---|---|
| 1,586,979 | Dudgill | June 1, 1926 |
| 2,428,934 | Gille | Oct. 14, 1947 |
| 2,709,097 | Leary | May 24, 1955 |